(12) United States Patent
Nicholson

(10) Patent No.: US 6,382,426 B1
(45) Date of Patent: May 7, 2002

(54) APPARATUS AND METHOD FOR REMOVING TOPS OR ROOTS FROM CROPS

(75) Inventor: David Nicholson, Norfolk (GB)

(73) Assignee: Nicholson Machinery Limited, Norfolk (GB)

( * ) Notice: Subject to any disclaimer, the term of this patent is extended or adjusted under 35 U.S.C. 154(b) by 0 days.

(21) Appl. No.: 09/380,785
(22) PCT Filed: Jan. 13, 1999
(86) PCT No.: PCT/GB99/00098
  § 371 Date: Nov. 9, 1999
  § 102(e) Date: Nov. 9, 1999
(87) PCT Pub. No.: WO99/35922
  PCT Pub. Date: Jul. 22, 1999

(30) Foreign Application Priority Data

Jan. 13, 1998 (GB) .............................................. 9800661

(51) Int. Cl.⁷ ............................................. B07B 13/00
(52) U.S. Cl. ....................... 209/618; 209/667; 209/669; 56/104; 56/103; 56/64; 99/635; 99/637; 99/640; 99/641
(58) Field of Search ................................. 209/606, 618, 209/667, 669; 56/104, 103, 64

(56) References Cited

U.S. PATENT DOCUMENTS

| | | | |
|---|---|---|---|
| 1,635,569 A | | 7/1927 | Ayars |
| 1,659,555 A | | 2/1928 | Ayars |
| 1,718,954 A | | 7/1929 | Hansen |
| 2,997,086 A | * | 8/1961 | Armer |
| 4,821,886 A | * | 4/1989 | Roethig ...................... 209/618 |
| 5,383,404 A | | 1/1995 | Nambu |
| 5,816,912 A | * | 10/1998 | Clark et al. ................. 460/114 |

FOREIGN PATENT DOCUMENTS

FR 2371155 6/1978 .......... A23N/15/08

* cited by examiner

Primary Examiner—Donald P. Walsh
Assistant Examiner—Jonathan R. Miller
(74) Attorney, Agent, or Firm—Shaw Pittman LLP

(57) ABSTRACT

A machine for removing roots and tops from crops including a pair of counter-rotating rollers spaced apart so as to define a nip therebetween, and means for rotating the rollers characterized in that at least one roller is in the form of a polygonal twisted prism.

29 Claims, 3 Drawing Sheets

APPARATUS AND METHOD FOR REMOVING TOPS OR ROOTS FROM CROPS

TECHNICAL FIELD

This invention relates to apparatus and methods for removing tops or roots from crops such as radishes.

BACKGROUND ART

Many purchasers demand that root crops be supplied with little or no tops or roots. In the distant past they were removed by hand using a blade. As will be explained hereinafter it is proving necessary to use this method again to meet the demands of some purchasers.

Mechanised crop toppers have been devised. They typically comprise a plurality of contra-rotating rollers with a small gap. At least some of the rollers have an upstanding helical bead or scroll formed on them. A very narrow gap extends between the tip of the bead and an adjacent roller. Material to be removed, for example, tops and roots are caught in this small gap or 'nip' and torn off. Unfortunately, especially if one wishes to crop the top or root close to the product, damage can ensue. For this reason some purchasers such as major supermarkets insist on manual removal of tops.

GB 2 313 284 (Richard Pearson Ltd) describes an agricultural separating device comprising a plurality of counter-rotating members. The counter rotating members comprise resiliently deformable starwheels.

GB 2 215 972 (N. A. Garford) describes a crop cleaning device comprising a plurality of counter-rotating spaced apart shafts. The shafts are provided with scrolls or flights.

JP 67 026 960 (Asahi Kasei Kogyo KK) describes a reinforced plastics pipe of twisted polygonal shape.

The invention seeks to overcome or reduce the problems associated with the prior art.

DISCLOSURE OF THE INVENTION

According to the invention there is provided a machine for removing roots and tops from crops the machine comprising a pair of counter-rotating rollers spaced apart so as to define a nip there between, and means for rotating the rollers characterised in that at least one roller is in the form of a polygonal twisted prism. Preferably, the polygonal twisted prism contains at least one full twist.

According to the invention there is provided a roller for a machine for removing the tops and roots of crops between the nips of a pair of counter-rotating rollers, the roller being in the form of a polygonal twisted prism.

According to the invention there is provided a method for removing the tops and roots of crops the method comprising;
providing at least one pair of counter-rotating rollers spaced apart so as to define a nip therebetween, and
introducing the roots or tops to the nip wherein at least one roller is in the form of a polygonal twisted prism.

It has unexpectedly been found that very good topping action can be obtained by twisting bar material. It is thought that the good results are a function of three features. First the bar corners are relatively sharp and provide a degree of cutting rather than the tearing action of the prior art rollers. Secondly there is a front clearance between the working edge and the body of the bar. This front clearance is almost absent in a cylindrical bar provided with a bead. The front clearance especially in a three or four sided bar is enhanced because bending the bar deforms the cross-section. In cross-section the initial planar faces of the bar become concave.

Thirdly the bar has, in effect, a multi-start helix.

The features allow more efficient removal of tops and roots. This allows the rotational speed of the rollers to be reduced by a factor of around 3 to 6 times while still allowing the same throughput. The reduction in rotational speed substantially reduces the probability of damage to the crop.

BRIEF DESCRIPTION OF FIGURES

Embodiments of the invention will be illustrated by reference to the accompanying figures of which.

MODES FOR CARRYING OUT THE INVENTION

Figure 1:
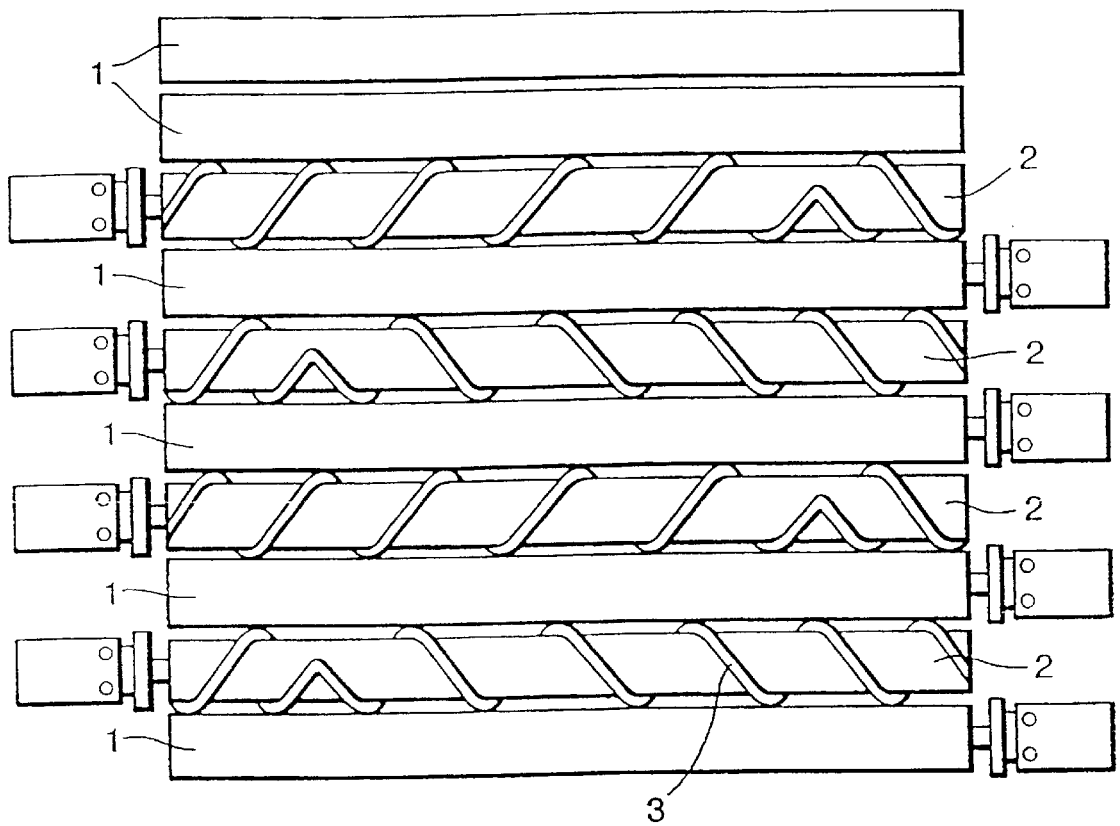
FIG. 1 is a plan view of a prior art arrangement.
Figure 1A:
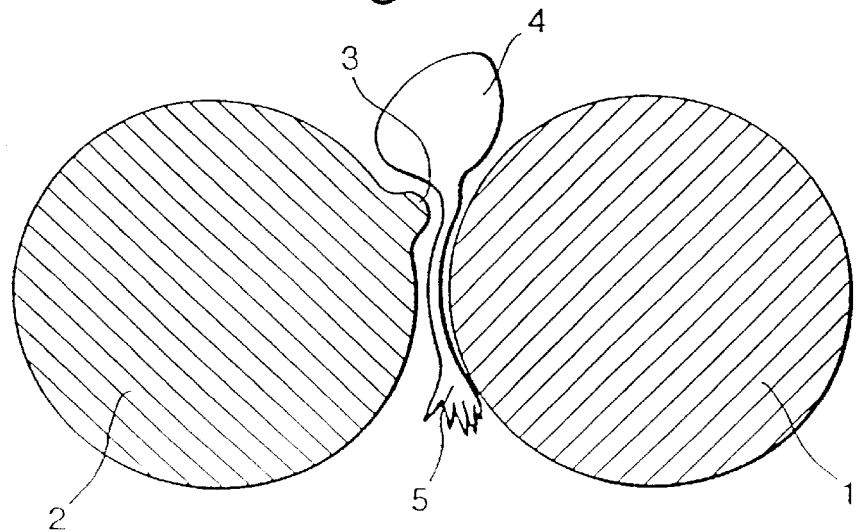
FIG. 1A is a side view of a crop topper of the prior art arrangement.

FIGS. 1 and 1A which are of the prior art shows a plain roller 1 and a counter rotating scrolled roller 2 with scroll 3. Crop 4 has a top 5. It will be seen that it is difficult to arrange for a small crop such as radish to be closely cropped.

Figure 2:
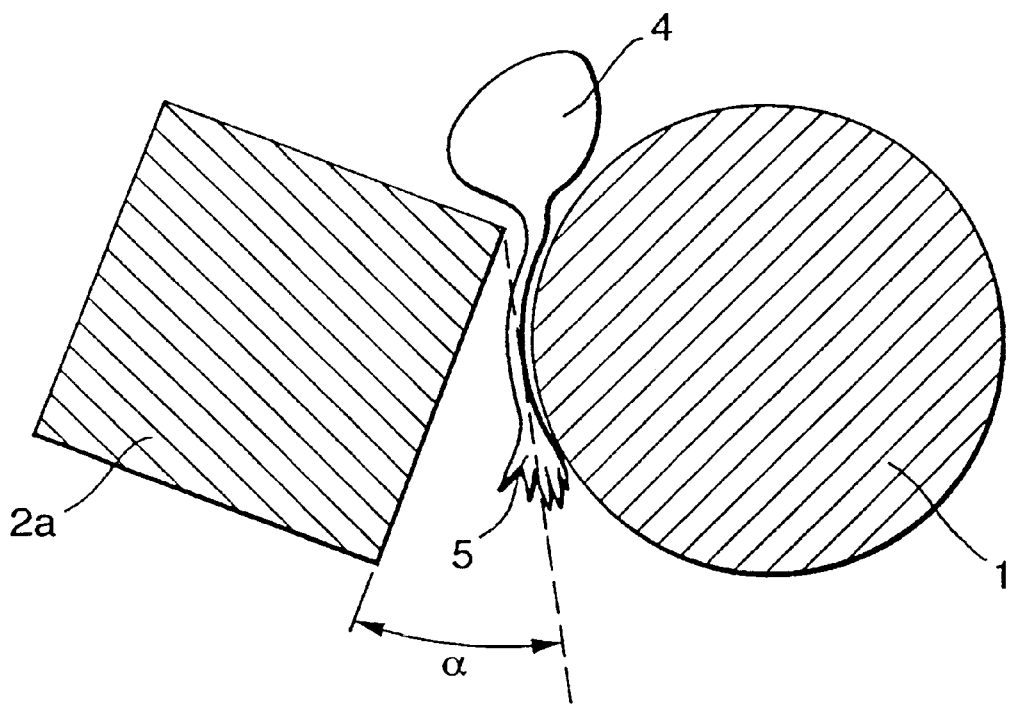
FIG. 2 is a side view of a crop topper of the invention.
Figure 3:
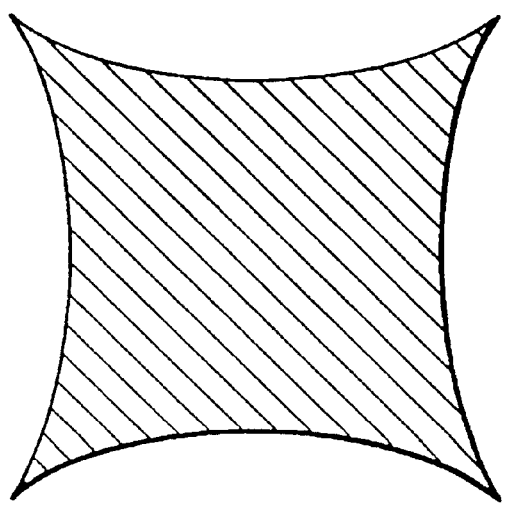
FIG. 3 is a cross-section of a roller of the invention.

By using the invention with for example a square bar 2a it will be apparent from FIG. 2 and FIG. 3 that a crop can be closely cropped and that this is aided by the concave faces of the bar.

As previously stated the roller can conveniently be made by twisting a bar. It is not essential to do this and the skilled will have little difficulty in making rollers in other ways examples including CAM and spiral milling. The recessed face, while desirable is not essential for the performance of the invention as can be seen from FIG. 2.

The roller conveniently has four faces but this is not essential. Preferably the roller has three to six facets more especially the bar has four or six facets. Hexagon bar is readily available in many sizes. Heptagon bar can be used but is less readily available. Octagon bar which can also be used has limited availability. Larger numbers of facets have limited front clearance a and hence a greater degree of concavity may be required. Pentagonal bar is not readily available and hence must be specially prepared or machined.

The invention can be retrofitted to existing machines by replacing or machining rollers or new machines can be constructed.

Figure 4:
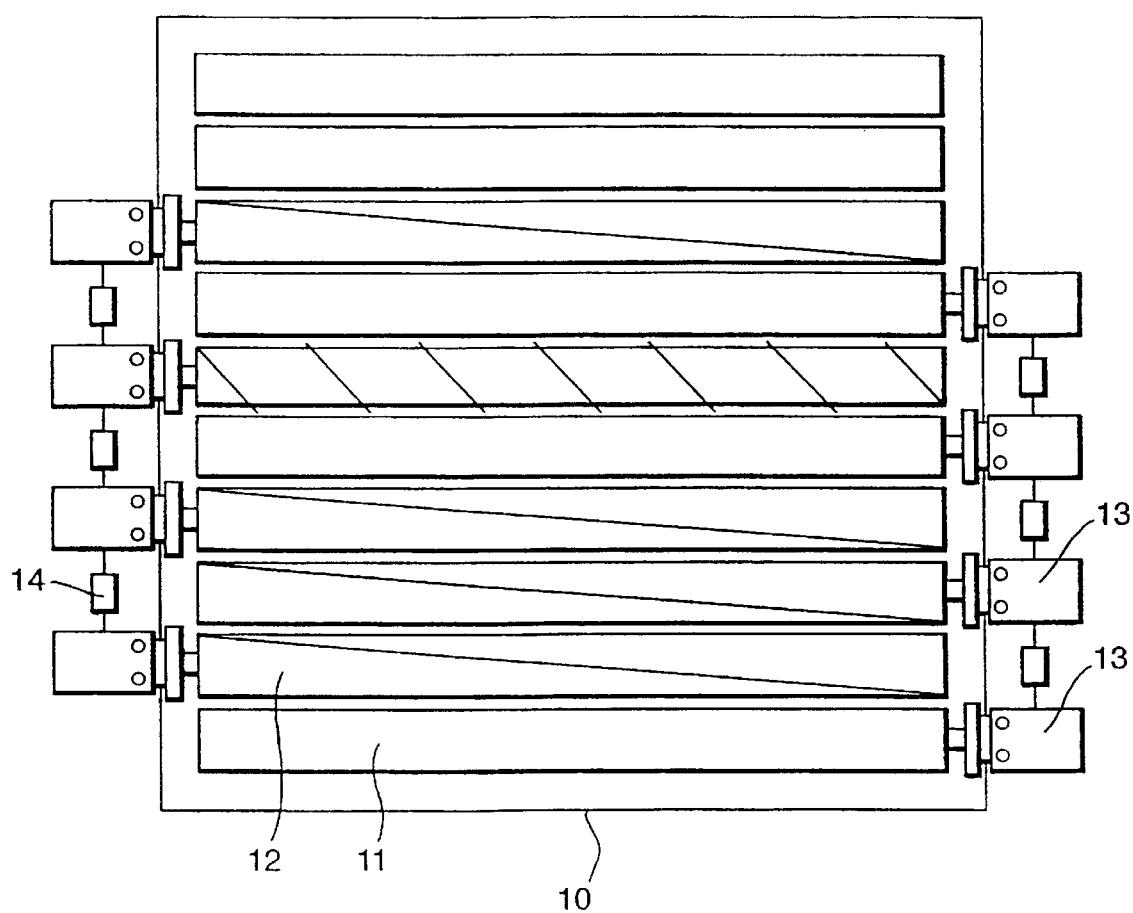
FIG. 4 is a plan view of a machine of the invention.

A typical machine is shown in FIG. 4. Bed 10 is provided with an array of rollers 11, 12. Rollers are provided with drive means 13 which as illustrated comprises individual electrical or hydraulic motors. A single drive such as a gear chain or chain or belt drive could however be employed. Adjusters 14 may be provided to allow adjustment of the roller spacing. At least some of the rollers will be capable of counter-rotating. At least some of the rollers will be faceted as herein before described. As illustrated the apparatus is provided with a plurality of plain rollers and rollers of the invention. They can alternate but this is not essential and as illustrated they may be arranged in groups.

In some embodiments of the invention the rollers are provided in a planar array. In some embodiments of the invention the planar array may be inclined to the horizontal to facilitate passage of product across the array.

Means for varying the inclination of the array and hence the residence time of product may be provided.

In some embodiments of the invention, including those where an inclined array is provided one or more rollers may stand out of the plane either above or below the plane. This can be helpful in providing suitable residence times. In some of these embodiment the displacement away from the plane may be adjustable to allow for regulation of residence times.

The twist of the rollers may all be of the same hand or some may be of one hand and some of the other. Some rollers may have portions of each hand.

What is claimed is:

1. A machine for removing roots and tops from crops, the machine comprising:

a topping screen having a first end and a second end, the topping screen including at least one pair of counter-rotating rollers arranged in parallel and spaced apart so as to define a nip therebetween situated between the first end and the second end, and means for rotating the rollers; wherein at least one roller is in the form of a polygonal twisted prism.

2. A machine according to claim 1, wherein the polygonal twisted prism has three to six facets.

3. A machine according to claim 2, wherein the polygonal twisted prism has four facets.

4. A machine according to claim 1, wherein the polygonal twisted prism contains at least one full twist.

5. A machine according to claim 1, wherein the at least one pair of counter-rotating rollers arranged in parallel and spaced apart so as to define a nip therebetween is a plurality of pairs of counter-rotating rollers arranged in parallel and spaced apart so as to define a nip therebetween.

6. A machine according to claim 5, wherein at least one roller of each pair is in the form of a polygonal twisted prism.

7. A machine according to claim 1, wherein the polygonal twisted prism is formed by twisting a polygonal bar.

8. A machine for removing roots and tops from crops, the machine comprising:

a topping screen having a first end and a second end, the topping screen including at least one pair of counter-rotating rollers arranged in parallel and spaced apart so as to define a nip therebetween situated between the first end and the second end, and means for rotating the rollers; wherein the at least one pair of rollers comprises a roller in the form of a polygonal twisted prism and a cylindrical roller.

9. A machine according to claim 8, wherein the polygonal twisted prism has three to six facets.

10. A machine according to claim 9, wherein the polygonal twisted prism has four facets.

11. A machine according to claim 8, wherein the polygonal twisted prism contains at least one full twist.

12. A machine according to claim 8, wherein the at least one pair of counter-rotating rollers arranged in parallel and spaced apart so as to define a nip therebetween is a plurality of pairs of counter-rotating rollers arranged in parallel and spaced apart so as to define a nip therebetween.

13. A machine according to claim 12 wherein each pair of rollers comprises a cylindrical roller and a roller in the form of a polygonal twisted prism.

14. A machine according to claim 13, wherein the topping screen is made up of alternating cylindrical rollers and rollers in the form of a polygonal twisted prism.

15. A machine according to claim 14, wherein the polygonal twisted prism is formed by twisting a polygonal bar.

16. A machine according to claim 8, wherein the polygonal twisted prism is formed by twisting a polygonal bar.

17. A machine for removing roots and tops from crops, the machine comprising:

a topping screen having a first end and a second end, the topping screen including at least one pair of counter-rotating rollers arranged in parallel and spaced apart so as to define a nip therebetween situated between the first end and the second end, and means for rotating the rollers; wherein at least one roller is in the form of a polygonal twisted prism and wherein the nip is defined by contact between one or more sections of a long edge of the at least one roller in the form of a polygonal twisted prism and the other roller of the at least one pair.

18. A machine according to claim 17, wherein the polygonal twisted prism has three to six facets.

19. A machine according to claim 18, wherein the polygonal twisted prism has four facets.

20. A machine according to claim 17, wherein the polygonal twisted prism contains at least one full twist.

21. A machine according to claim 17, wherein the at least one pair of counter-rotating rollers arranged in parallel and spaced apart so as to define a nip therebetween is a plurality of pairs of counter-rotating rollers arranged in parallel and spaced apart so as to define a nip therebetween.

22. A machine according to claim 21, wherein at least one roller of each pair is in the form of a polygonal twisted prism.

23. A machine according to claim 22, wherein the polygonal twisted prism is formed by twisting a polygonal bar.

24. A machine according to claim 17, wherein the polygonal twisted prism is formed by twisting a polygonal bar.

25. A machine for removing roots and tops from crops, the machine comprising:

a topping screen having a first end and a second end, the topping screen including at least one pair of counter-rotating rollers arranged in parallel and spaced apart so as to define a nip therebetween situated between the first end and the second end, and means for rotating the rollers; wherein the at least one pair of rollers comprises a roller in the form of a polygonal twisted prism a cylindrical roller, and wherein the nip is defined by contact between one or more sections of a long edge of the roller in the form of a polygonal twisted prism and the cylindrical roller.

26. A method for removing roots and tops from crops, the method comprising:

providing a topping screen having a first end and a second end, the topping screen including at least one pair of counter-rotating rollers arranged in parallel and spaced apart so as to define a nip therebetween situated between the first end and the second end, and passing crops along the topping screen between the first end and the second end to introduce roots or tops to the nip; wherein at least one roller is in the form of a polygonal twisted prism.

27. A method for removing roots and tops from crops, the method comprising:

providing a topping screen having a first end and a second end, the topping screen including at least one pair of counter-rotating rollers arranged in parallel and spaced apart so as to define a nip therebetween situated between the first end and the second end, and passing crops along the topping screen between the first end and the second end to introduce roots or tops to the nip; wherein the at least one pair of rollers comprises a roller in the form of a polygonal twisted prism and a cylindrical roller.

28. A method for removing roots and tops from crops, the method comprising:

providing a topping screen having a first end and a second end, the topping screen including at least one pair of counter-rotating rollers arranged in parallel and spaced apart so as to define a nip therebetween situated between the first end and the second end, and passing crops along the topping screen between the first end and the second end to introduce roots or tops to the nip; wherein at least one roller is in the form of a polygonal twisted prism and wherein the nip is defined by contact between one or more sections of a long edge of the at least one roller in the form of a polygonal twisted prism and the other roller of the at least one pair.

29. A method for removing roots and tops from crops, the method comprising:

providing a topping screen having a first end and a second end, the topping screen including at least one pair of counter-rotating rollers arranged in parallel and spaced apart so as to define a nip therebetween situated between the first end and the second end, and passing crops along the topping screen between the first end and the second end to introduce roots or tops to the nip; wherein the at least one pair of rollers comprises a roller in the form of a polygonal twisted prism and a cylindrical roller, and wherein the nip is defined by contact between one or more sections of a long edge of the at least one roller in the form of a polygonal twisted prism and the cylindrical roller.

* * * * *